(12) United States Patent
Terry et al.

(10) Patent No.: US 6,313,845 B1
(45) Date of Patent: *Nov. 6, 2001

(54) METHOD AND APPARATUS FOR TRANSPORTING INFORMATION TO A GRAPHIC ACCELERATOR CARD

(75) Inventors: Joseph Clay Terry, Huntsville; Dale L. Kirkland, Madison; Steve Conklin, Madison; Matthew C. Quinn, Madison, all of AL (US)

(73) Assignee: 3Dlabs Inc. Ltd., Hamilton (BM)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/345,678

(22) Filed: Jun. 30, 1999

Related U.S. Application Data

(60) Provisional application No. 60/091,601, filed on Jun. 30, 1998.

(51) Int. Cl.⁷ .................................................. G06F 13/00
(52) U.S. Cl. ............................................. 345/537; 345/522
(58) Field of Search ..................................... 345/501–503, 345/520–522, 516, 508, 511, 537, 559, 564

(56) References Cited

U.S. PATENT DOCUMENTS

| | | | |
|---|---|---|---|
| 5,321,806 | * 6/1994 | Meinerth et al. | 345/522 |
| 5,524,220 | * 6/1996 | Verma et al. | 712/207 |
| 5,630,075 | * 5/1997 | Joshi et al. | 711/100 |
| 5,696,917 | * 12/1997 | Mills et al. | 711/1 |
| 5,706,478 | * 1/1998 | Dye | 345/503 |
| 5,751,295 | * 5/1998 | Becklund et al. | 345/501 |
| 5,796,413 | * 8/1998 | Shipp et al. | 345/522 |
| 5,859,623 | * 1/1999 | Meyn et al. | 345/508 |
| 5,870,622 | * 2/1999 | Gulick et al. | 345/502 |
| 5,889,948 | * 3/1999 | Smolansky et al. | 709/213 |
| 5,941,960 | * 8/1999 | Miller et al. | 710/35 |
| 5,943,066 | * 8/1999 | Thomas et al. | 345/515 |
| 6,008,701 | * 7/2000 | Whaley et al. | 707/102 |
| 6,058,438 | * 5/2000 | Diehl et al. | 710/24 |
| 6,075,546 | * 6/2000 | Hussain et al. | 345/522 |
| 6,124,865 | * 9/2000 | Meinerth et al. | 345/501 |

* cited by examiner

*Primary Examiner*—Ulka J. Chauhan
(74) *Attorney, Agent, or Firm*—Groover & Associates; Robert Groover

(57) ABSTRACT

A graphics request stream is transferred from a host processor to a graphics card via a host bus so that the stream traverses the host bus no more than once. To that end, the graphics card has a graphics card memory, and the host processor has a host memory configured in a first memory configuration. The graphics card memory may be configured in the first memory configuration, and the graphics request stream is received directly in a message from the host processor (via the host bus). Upon receipt by the graphics card, the graphics request stream is written to the graphics card memory.

15 Claims, 6 Drawing Sheets

METHOD AND APPARATUS FOR TRANSPORTING INFORMATION TO A GRAPHIC ACCELERATOR CARD

PRIORITY

This application claims priority from U.S. provisional patent application Ser. No. 60/091,401, filed: Jun. 30, 1998, entitled Method and System for Transporting Information to a Graphic Accelerator Card, the disclosure of which is incorporated herein, in its entirety, by reference.

FIELD OF THE INVENTION

The present invention is related to graphics accelerator cards and, more particularly, involves the use of memory on graphics accelerator cards.

BACKGROUND OF THE INVENTION

Typical computer systems employ a graphics accelerator card for enhancing the resolution and the display of graphics. The display of graphics requires a two part process, rendering and geometry acceleration. In prior art graphics cards, the geometry phase was performed by the central processing unit (CPU) of the computer system while the rendering phase was performed by the graphics card. The (CPU) is often referred to as a host processor. This often overloaded the CPU, since graphics were vying for processor time with external applications. Currently, high-end graphics cards have been configured to perform both the rendering phase and the geometry phase. This system improves performance and graphic rendering because the central processing unit is free to perform other processes while the graphics are being processed on the graphics card.

Although performance is increased during processing by having the graphics card perform both rendering and geometry acceleration, the graphics request must still be sent to the graphics card through the CPU which involves significant memory swaps between RAM memory and cache memory associated with the CPU.

See FIG. 1 for a schematic diagram of the components involved in an exemplary prior art graphics card. FIG. 1 shows a host processor 9 of a computer system which is connected to a bus 1. The bus 1 is used for transporting information to and from various components of the computer system, including main memory 7. The host processor 9 receives a request from an application level program to create a graphics display. The request may be in the form of a group of instructions which accesses an application program interface ("API") 11. The API converts the instructions into a graphics request stream 10 which is capable of being understood by the graphics accelerator. The graphics request stream 10 is transmitted to a cache 8 associated with the host processor, and placed into a cache line via bus 1. The graphics request stream is transported from the cache 8 across the bus 1 and deposited in a graphics memory location 106 of the graphics card 104. The graphics request stream 10 is processed by a graphics processor 105 and then sent to a display device.

FIG. 2 shows a prior art method of receiving the graphics request and transporting the graphics request stream to the graphics accelerator card for processing. The process begins at step 302, in which an application level program makes a request for a graphics display. This causes the appropriate functions of the API 11 to be called. The result of the API functions form a graphics request stream 10 based on the request from the application level program in step 304.

The host processor 9 writes the graphics request stream 10 to main memory 7 in step 306, which requires the graphics request stream to pass across the system bus. Cache read and write is indicated by a subscript numeral in FIG. 1. Because the position in main memory 7 that is written to is typically not in the cache 8, and the cache line usually has data in it that is not coherent with main memory 7, a cache line swap must take place. This involves writing the current cache line contents into an associated main memory location 7, (step 308), and writing the newly addressed cache line 12 having the graphics request stream into the cache (step 310). Thus, writing the graphics request stream to the cache of the CPU requires the graphics request stream to pass across the system bus twice. Once the data of the graphics request stream 10 is cached in the cache memory, it still must be moved into the graphics system before rendering can occur, thus requiring a third crossing of the system bus, (step 312). To do this, a graphics processor 105 on the graphics card 104 is controlled by driver software. The driver software causes the host processor to read the graphics request stream 10 from the cached memory 8, and then passes the graphics request stream to the graphics processor 105 of the graphics card which writes it into a memory location 106 for processing (step 314). Once initiated, the graphics processor 105 proceeds without further intervention by the CPU 9, and the processed graphics request stream is displayed by a display device, (step 316).

In summary, each word of data of the graphics request stream that is moved into the graphics accelerator requires two transactions for storage in cache memory, and one transaction to move it from cache memory 8 to the graphics pipeline 106. Processing data in this way thus requires at least three read/writes across the system bus, consequently reducing the rendering speed to no faster than about thirty-three percent of the system bus rate.

SUMMARY OF THE INVENTION

In accordance with one aspect of the invention, a graphics request stream is transferred from a host processor to a graphics card via a host bus so that the stream traverses the bus no more than once. To that end, the graphics card has a graphics card memory, and the host processor has an address system for addressing the graphics card memory. In accordance with preferred embodiments of the invention, the graphics card receives the graphics request stream directly in a message from the host processor (via the host bus). Upon receipt by the graphics card, the graphics request stream is written to the graphics card memory.

In yet another embodiment the method the graphics request stream is written through the host processor's write combing buffer.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF THE EMBODIMENTS

Figure 1:
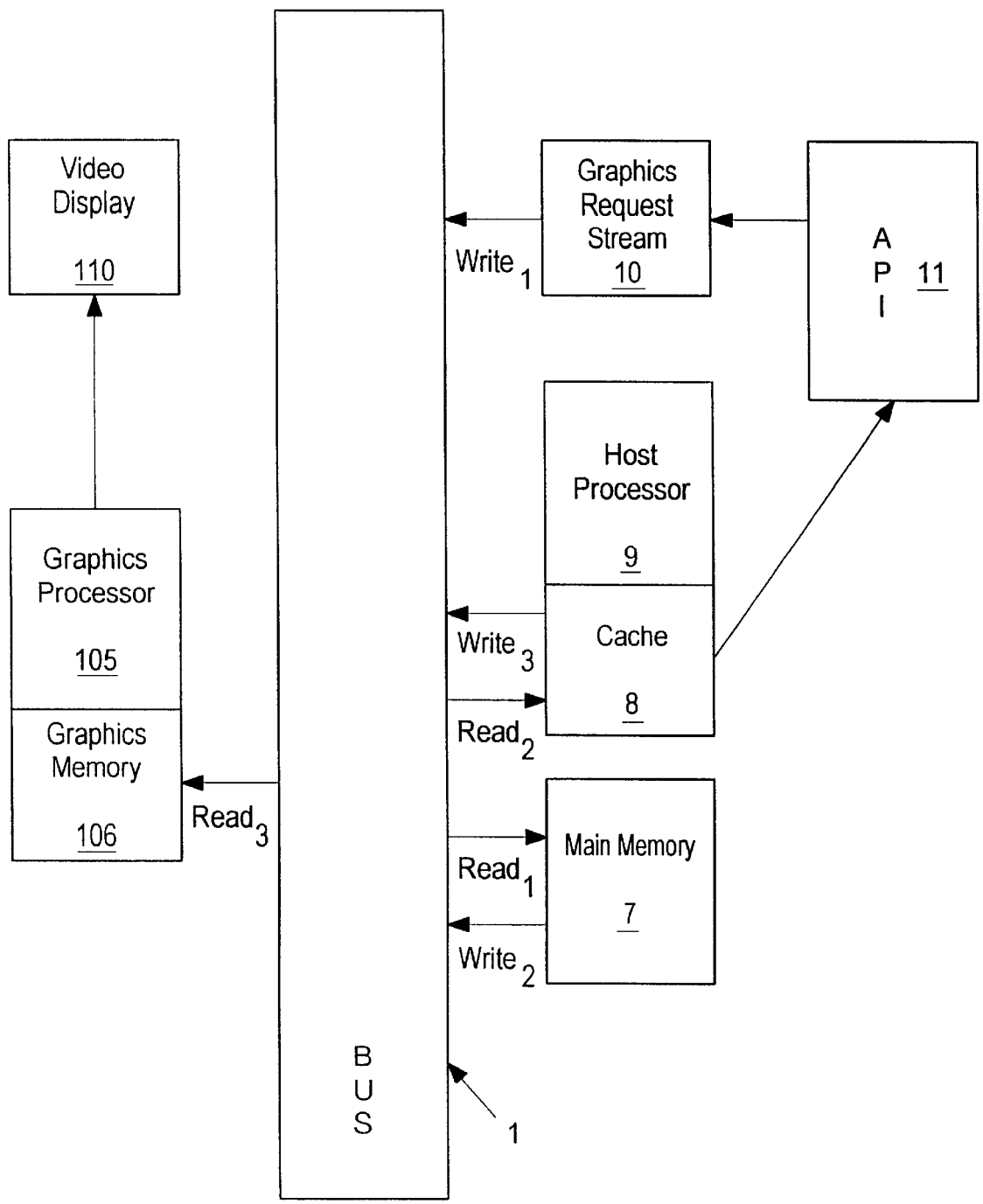
FIG. 1 is block diagram of a prior art system for placing a graphics request stream into the cache of the host processor.
Figure 2:
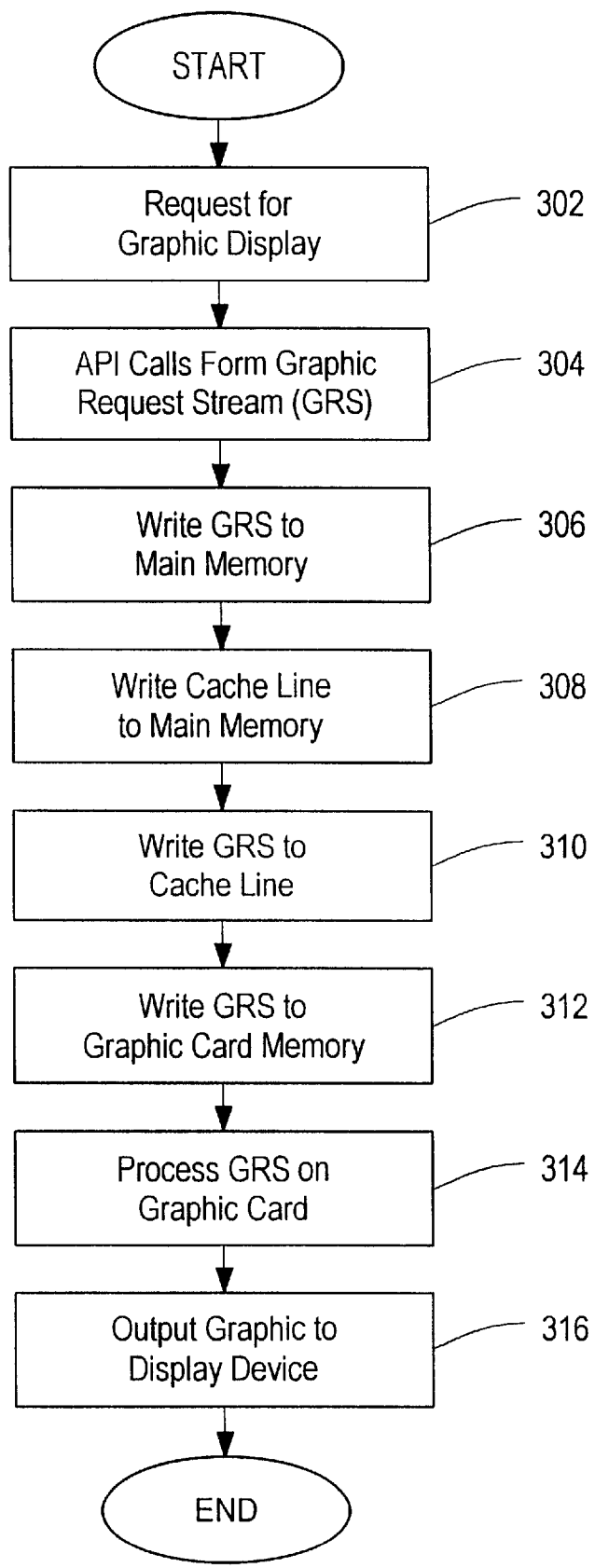
FIG. 2 is a flow chart of the method used in transferring a graphics request stream onto a graphics accelerator in a prior art system.
Figure 3:
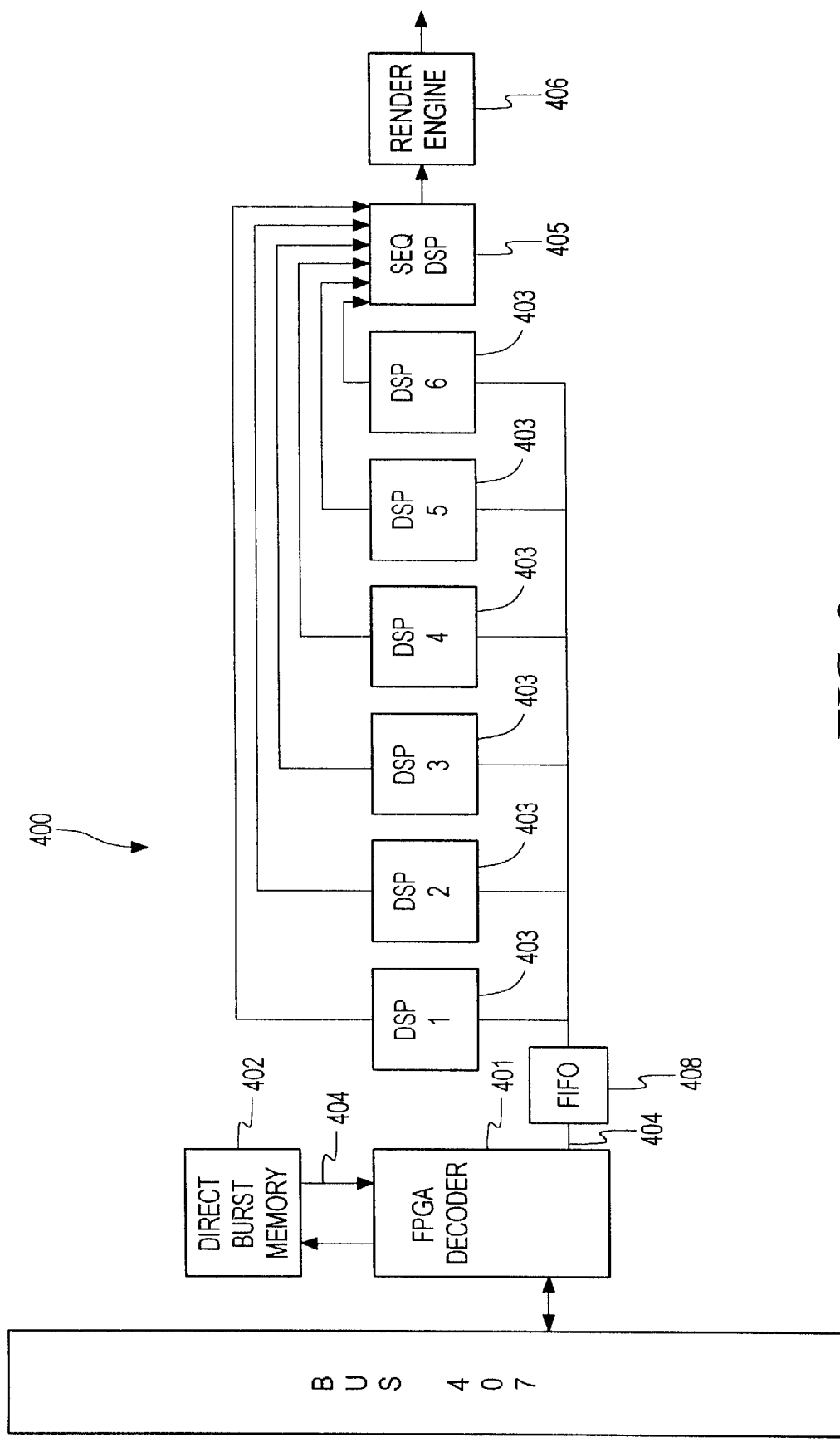
FIG. 3 is a block schematic of a graphics card in which a preferred embodiment of the invention may be implemented.
Figure 4:
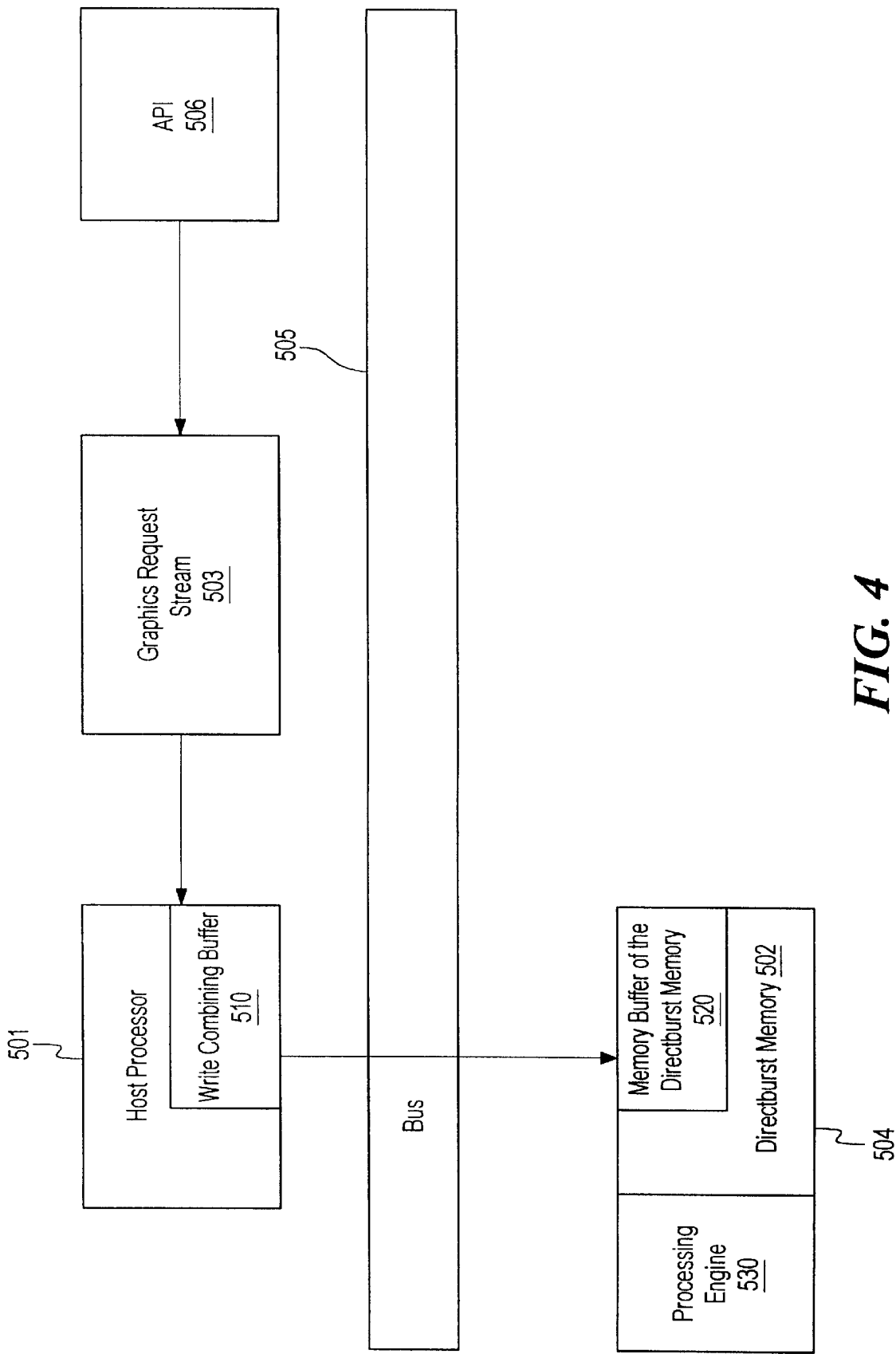
FIG. 4 is a flow chart of a preferred method for transporting a graphics request to direct burst memory of a graphics card.

In the following description and claims, the term "graphics request stream" shall refer to multiple instructions which are in a format which is understood by and which may be processed by a graphics card to form a graphical image which can be displayed. In accordance with a preferred embodiment of the invention, a graphics request stream may be transferred directly from a host processor to a memory location on a graphics accelerator card ("graphics card" or "accelerator"). FIG. 3. shows an accelerator 400 which is utilized in a preferred embodiment of the invention. The accelerator 400 is a peripheral component interconnect "PCI" peripheral for a personal computer and connects to a PCI bus 407. The accelerator 400 includes a decoder shown as a field programmable gate array (FPGA) 401 which provides a PCI bus interface to a graphics card memory 402, hereinafter referred to as "directburst memory". The directburst memory 402 preferably is synchronous dynamic random access memory (SDRAM) that is memory mapped as write combining memory format into the host processor memory configuration, thus allowing the host processor to send data directly to the direct burst memory as if the memory were on the host processor. The process of memory mapping is performed upon the boot up of the host processor. A driver associated with the graphics card is activated by the operating system and the driver requests a memory address segment which is associated with the host processor. The driver associates the memory address segment of the host processor with a memory buffer 520 which is a segment of contiguous directburst memory 502 on the graphics card 504 as shown in FIG. 4. The graphics card 504 is composed of the directburst memory 502 and the processing engine 530. The memory buffer of the directburst memory 502 can accept burst write or multiple word transfers across bus 505. In a preferred embodiment the directburst memory is thirty-two bits wide.

Graphics commands from a graphics application are translated by a graphics API. 506 into a graphics request stream 503 and passed to a write combining buffer 510 of the host processor. The driver in conjunction with the host processor 501 reads the graphic request stream 503 from the write combining buffer 510 built up in memory associated with the host processor and writes it to the memory buffer 520 of the directburst memory 502 through the FPGA. The write combining buffer 510 is not part of cache memory, is not snooped and does not provide data coherency. In a preferred embodiment, there are two sets of write combining registers that make up the write combining buffer 510. The write combining register sets each can hold eight thirty-two bit quantities and each register set is written to the graphics card in turn when the register set is full under normal conditions. As the graphics request stream is bursted from the registers, it is received at the graphics card as a serial sequence of contiguous thirty-two bit quantities. The FPGA decodes and recognizes that burst writes are being received and generates sequential addresses to the memory buffer of the graphics card 504 as it writes each 32-bit quantity to the 32-bit wide memory. It should be understood to one skilled in the art that other decoders implementations may be substituted for the FPGA. Because write combining memory has weak ordering semantics, the ordering may not be maintained for the graphics request stream when it is sent from the write combining registers to the graphics card. However, since each instruction of the graphics request stream has an associated address and the graphics card memory is random access memory (RAM), the ordering is resolved by the FPGA and RAM memory when each address of the graphics request stream is associated with the memory space for that address.

Returning to FIG. 3, the FPGA 401 also connects to a FIFO (First-in First-out) set of registers 404 which connect to a set of digital signal processing chips (DSPs) 403. The FPGA. 401 contains a DMA (Direct Memory Access) engine (not shown) which has a DMA channel 404 that is dedicated to moving data from the directburst memory 402 to the FIFO 408. In the preferred embodiment, the memory buffer of the directburst memory is double buffered so that one buffer can be under construction by the driver while the contents of the companion buffer are being copied to the FIFO by the DMA engine through the DMA channel. The DSPs then employ internal DMA channels to move the data from the FIFO into the DSPs. There are six such DSP chips 403 in the preferred embodiment. These six DSP chips make up what is known as the request DSPs. The request DSPs perform the geometry acceleration on the graphics request stream. The geometry stage processing performed by the request DSPs 403 first transforms polygons of three dimensional objects into polygons that can be drawn on a computer screen, then calculates the lighting characteristics, and finally generates a coordinate definition in three dimensions for each polygon. A second DSP chip known as a sequencer DSP 405 strings the processed requests together in the proper order from the request DSPs 403 and passes strings to a rendering engine 406 for eventual display by a display screen (not shown). The rendering stage performed by the rendering engine converts polygon information to pixels for display. It involves applying shading, texture maps, and atmospheric/special effects to the polygon information provided by the geometry stage. Additional explanation of the graphics card is provided in U.S. Provisional Patent Application entitled WIDE INSTRUCTION WORD GRAPHICS PROCESSOR, Serial No. 60/093,165, filed Jul. 17, 1998.

Figure 5:
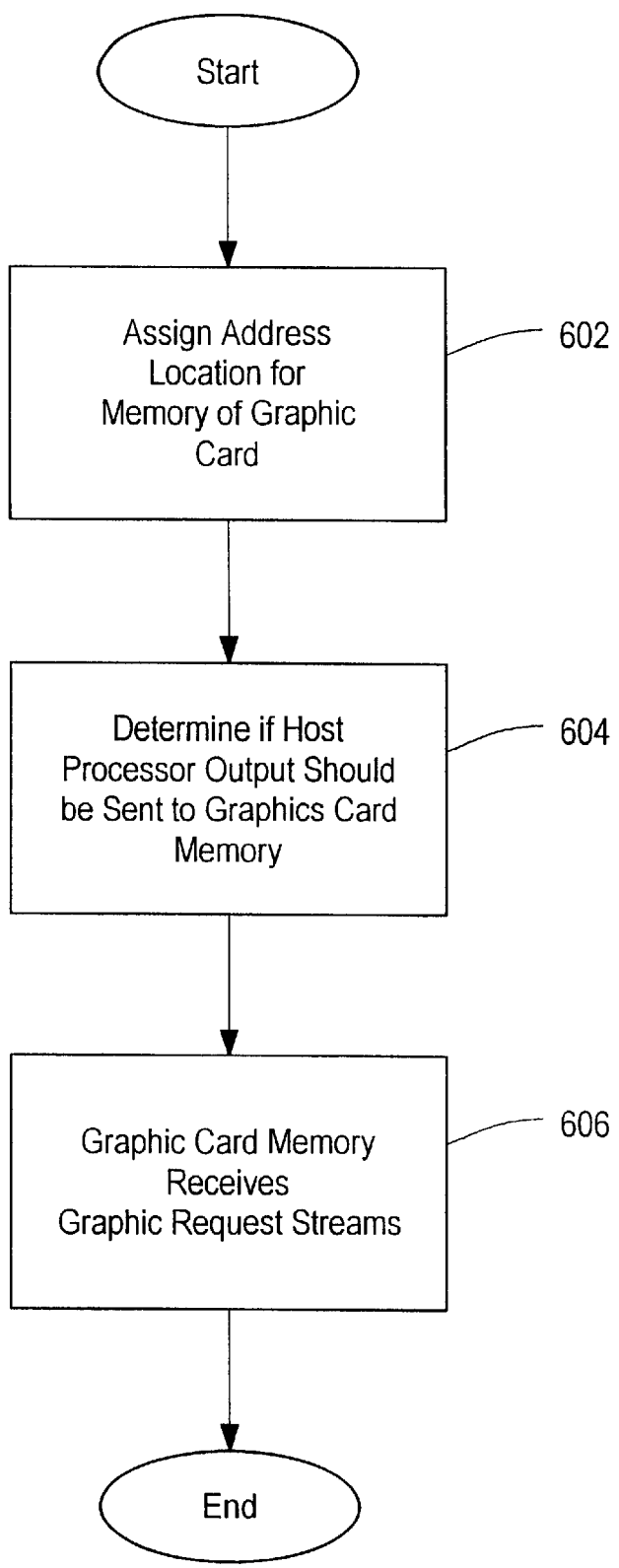
FIG. 5 is a block diagram of a system in which preferred methods for transferring graphics requests to the graphics card can be implemented.

FIG. 5 is flow chart of the steps taken in configuring the host processor to transfer graphics request streams to the graphics card. Host processors, such as the PentiumPro™ microprocessor having a P6 bus (available from Intel Corporation of Santa Clara, California) are provided with the ability to assign a memory address to a memory location which is outside of RAM memory associated with the host processor. The method first assigns an address of the host processor to memory from the graphics card. (Step 602) The driver associated with the graphics card asks the operating system to provide a block of memory addresses that are equivalent to the memory size of the directburst memory on the graphics card. In one embodiment, the host processor has a limited number of memory address locations and the host processor has designated memory addresses allocated for external devices which have associated memory.

When a graphics request stream is sent to the host processor, the host processor recognizes that the graphics request stream should be sent to the memory located on the graphics card based upon the address for the graphics request stream. (Step 604) The host processor fills a write combining buffer with the graphics request stream until the write combining buffer is full. The host processor then sends the graphic request streams directly to the direct burst memory of the graphics card (Step 606).

Figure 6:
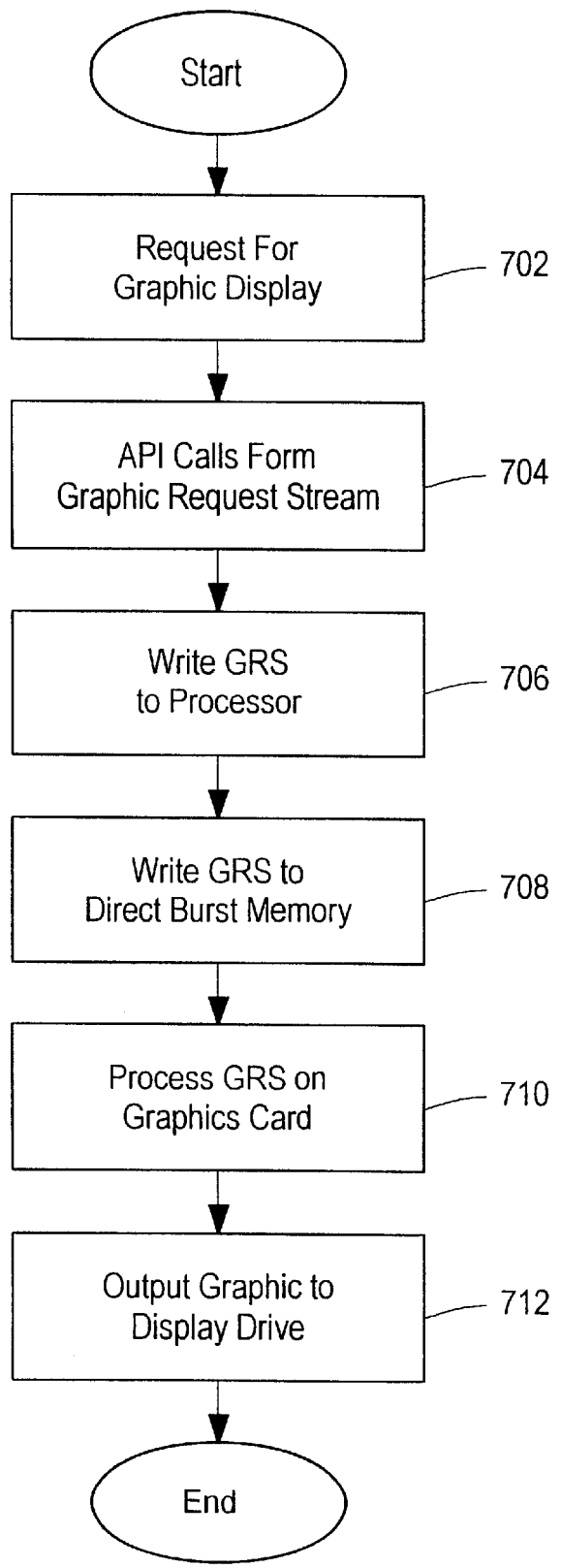
FIG. 6 is a flow chart of a preferred method of transmitting a graphics request stream to a graphics card.

FIG. 6 is a flow chart of a preferred method of transmitting a graphics request stream to a graphics card. In response to an application level program that requests a graphics display, the preferred method eliminates the need to transfer the request to the cached main memory of the host processor by transmitting the requests from the CPU in an efficient manner. Specifically, in step 702, the application level program makes a call through the host processor via API calls for graphics rendering. In one embodiment, the API 506 is the OpenGL™ API. OpenGL is an industry standard 3D graphics processing library that allows computer programmers to draw sophisticated graphics on the computer video screen by making calls to OpenGL graphics library commands. The API commands are then translated by a driver program which formats the API commands into an graphics request stream that is understood by the graphics card. Once the API calls 506 are translated, the graphics request stream, 503 is directed to the graphics card 504 (step 704).

The graphic request stream is written directly by the processor in step 706, to the directburst memory 502 on the graphics card. The host processor 501 has the directburst memory 502 mapped into the host processor. Additionally, for increased speed, the direct burst memory 502 on the video graphics card 504 can accept burst write transfers which traverse the processor bus and the PCI bus 505 only once (step 708). This consequently frees up the cached main memory for other memory intensive calculations and reduces the total amount of reads and writes for the host processor. Write combining buffers in the host processor, as well as in the PCI bus interface device (not shown), ensure that the writes transpire across the PCI bus as large efficient bursts. Once the graphics request stream is stored in the graphics card's memory, the graphics request stream may be placed in a FIFO for access by the DSPs. The graphic request streams are processed in the request DSPs and in the rendering engine of the chip in step 710. In step 712, the output is then sent to a display device for display.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method of transferring a graphics request stream from a host processor to a graphics card, the method comprising:

receiving said graphics request stream in said host processor;

said host processor writing said graphics request stream from a write-combining buffer directly to a memory location on said graphics card, said write-combining buffer not being part of cache memory.

2. The method according to claim 1, further comprising the step of:

recognizing each address within the graphics request stream;

wherein the graphics request stream is written to the corresponding address in the graphics card memory.

3. The method according to claim 2, wherein the graphics request stream is in order after the step of writing.

4. The method according to claim 1, wherein the graphics card memory is random access memory.

5. The method according to claim 4, wherein said random access memory is synchronous dynamic access memory.

6. A method of transferring a graphics request stream from a host processor to a graphics card, the method comprising:

writing the graphics request stream to said host processor;

reading the graphics request stream from the host processor;

traversing a system bus with the graphics request stream no more than once;

said host processor writing the graphics request stream directly to a memory location on the graphics card;

wherein in the step of writing the graphics request stream to the host processor, the graphics request stream is written to a write combining register in the host processor which is not part of cache memory.

7. The method according to claim 6, wherein the memory location on the graphics card is random access memory.

8. The method according to claim 7, wherein a field programmable gate array directs each instruction of the graphics request stream to an associated address in the random access memory.

9. The method according to claim 6, wherein the host processor has a system for assigning addresses to memory, the method further comprising the step of assigning an address to the memory of the graphics card.

10. The method according to claim 7, wherein in the step of assigning the address to memory, the memory is assigned as write combining memory.

11. The method according to claim 6, wherein each instruction of the graphics request stream is associated with an address on the graphics card and in the step of writing, the graphics request stream is written in bursts, in which, multiple instructions of the graphics request stream are written to the graphics card at the same time.

12. A system for processing a graphics request stream, the system comprising:

a host processor containing a buffer which is designated as a write combining buffer, wherein said buffer is not marked cacheable, and is independent of any caches on said host processor;

a graphics processor which contains graphics memory, said graphics processor being connected to said host processor through a bus to receive a graphics request stream from said buffer.

13. The system according to claim 12, further comprising addressable memory for receiving instructions of the graphics request stream, and a decoder for recognizing an address associated with the instructions of the graphics request stream and forwarding the instructions to the addressable memory.

14. The system according to claim 13, wherein the decoder is a field gate programmable array.

15. The system according to claim 13, wherein the instructions are ordered by the decoder so that the instructions are placed in contiguous addressable memory locations.

* * * * *